US005617676A

United States Patent [19]
Kleefeldt et al.

[11] Patent Number: 5,617,676
[45] Date of Patent: Apr. 8, 1997

[54] MOTOR-VEHICLE DOOR

[75] Inventors: Frank Kleefeldt, Heiligenhaus; Damien Labonde, Essen; Klaus-Peter Reis, Detern-Velde, all of Germany

[73] Assignee: Kiekert AG, Heiligenhaus, Germany

[21] Appl. No.: 650,133

[22] Filed: May 17, 1996

[30] Foreign Application Priority Data

May 18, 1995 [DE] Germany ............ 195 18 300.2

[51] Int. Cl.⁶ .................................. B60J 5/04
[52] U.S. Cl. ............................... 49/502; 49/503
[58] Field of Search ................ 49/503, 502, 394; 296/146.1

[56] References Cited

U.S. PATENT DOCUMENTS

| | | | |
|---|---|---|---|
| 5,050,350 | 9/1991 | Bertolini et al. | 49/502 |
| 5,111,620 | 5/1992 | Lau et al. | 49/502 |
| 5,308,129 | 5/1994 | Hlavaty | 49/502 X |

FOREIGN PATENT DOCUMENTS

| | | |
|---|---|---|
| 0406034 | 10/1992 | European Pat. Off. . |
| 0385823 | 4/1993 | European Pat. Off. . |
| 4407114 | 5/1995 | Germany . |

*Primary Examiner*—Philip C. Kannan
*Attorney, Agent, or Firm*—Herbert Dubno; Andrew Wilford

[57] ABSTRACT

A motor-vehicle door has an outer skin and an inner skin fixed to the outer skin, forming therewith a cavity, and formed with a cutout. A mechanism holder is releasably secured in the cavity at the cutout. A latch is secured by a horizontally effective slide mount on the holder and can move via the mount horizontally on the holder and be fixed on the holder in any of a plurality of horizontally offset positions thereon. A detent engaged between the slide mount and the latch releasably secures the latch in one of the positions. The slide mount includes a pair of interfitting and horizontally extending rails respectively fixed to the holder and to the latch.

6 Claims, 3 Drawing Sheets

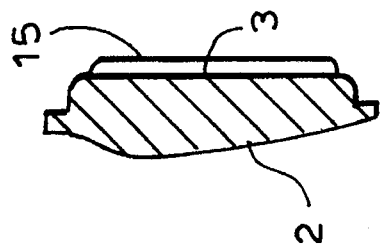
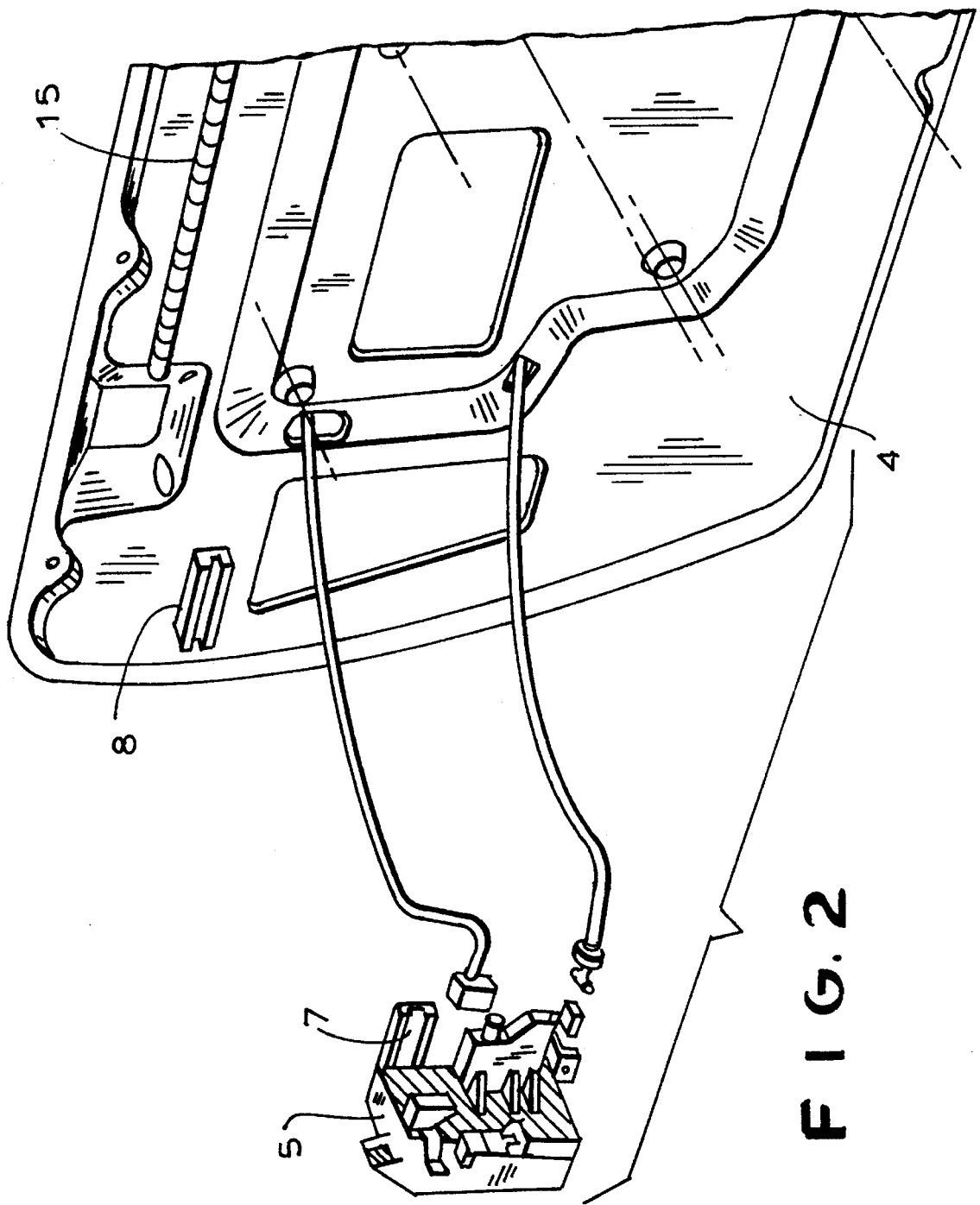

MOTOR-VEHICLE DOOR

FIELD OF THE INVENTION

The present invention relates to a motor-vehicle door. More particularly this invention concerns such a door having an outer wall, an inner wall, and a holder for the door latch as well as other door components.

BACKGROUND OF THE INVENTION

A standard motor-vehicle door has welded-together inner and outer door panels or walls made of sheet metal and forming a central cavity that holds the latch and window parts which are inserted into the door through a hole in the inside wall. The inside wall is covered in use by a decorative panel.

As described in European patents 0,385,823 and 0,406,034 of Bertolini and in German patent document 4,407,114 of Hundertmark, the vehicle door latch is fixed to a holder that also carries the window operating mechanism. This entire unit is fitted to the door through the hole in its inside wall and is normally secured in place therein by screws. This holder carrying the door mechanisms is produced normally at one location and the actual door at another, and they are only united on assembly where the door is installed on the vehicle body and then the holder is fitted to the door.

Obviously such a system requires that the door and holder be manufactured to extremely close tolerances so that they fit together. Furthermore the door itself must fit perfectly in the vehicle body for the latch to operate. Clearly there are frequently circumstances where, due to manufacturing problems, the fit is not perfect and, as a result, the latch cannot function.

Another problem with these systems is that subsequent servicing of the latch, which is subject to considerable wear in normal use, is not possible. Instead the entire holder with all the other associated mechanisms must be replaced, greatly increasing the cost of what would otherwise be a simple repair.

OBJECTS OF THE INVENTION

It is therefore an object of the present invention to provide an improved motor-vehicle door.

Another object is the provision of such an improved motor-vehicle door which overcomes the above-given disadvantages, that is which allows the latch to be adjusted if necessary and even to be switched out at a later date without replacing other adjacent devices.

SUMMARY OF THE INVENTION

A motor-vehicle door has according to the invention an outer skin and an inner skin fixed to the outer skin, forming therewith a cavity, and formed with a cutout. A mechanism holder is releasably secured in the cavity at the cutout. A latch is secured by a horizontally effective slide mount to the holder and can move via the mount horizontally on the holder and be fixed on the holder in any of a plurality of horizontally offset positions thereon. A detent engaged between the slide mount and the latch releasably secures the latch in one of the positions.

According to the invention the slide mount includes a pair of interfitting and horizontally extending rails respectively fixed to the holder and to the latch. One of the rails, normally that rail secured to the holder, engages around the other rail, although the C-section rail could also be mounted on the latch.

The detent according to this invention includes a spring braced against one of the rails and a formation on the other rail operatively engageable with the spring. The formation is a notch and the spring has a bight resiliently engageable in the notch.

The invention is based on the recognition that the simple provision of a slide-type mount of the latch on the holder solves two problems, namely making the latch movable to compensate for misalignment of the door in the opening and making it possible to replace the latch alone. The holder need not be taken out of the door to replace the latch; instead the latch alone can be removed. One need merely remove the inside decorative door panel and then loosen the attachments, typically screws, locking the latch on the slide of the holder, and remove it.

The instant invention provides substantial advantages. The holder can be preassembled with the door latch and other elements of door hardware, such as for instance the one channel and operating motor for the window. The latch is temporarily secured in place on the slide so that it does not slip therefrom during preinstallation handling and even an assembly robot can be used to mount the assembly in the door. The latch itself can easily be secured by screws on the edge of the door because the door interior is as described above accessible through the cutout once the inside panel is removed. If an adjustment is needed the latch is slid from its preinstallation position to the desired position and screwed in place. To remove the latch, its screws are withdrawn and it is slid horizontally in the travel direction away from the door edge so it slides off the end of the holder-mounted rail. An arm or the like can be provided on the latch to facilitate its adjustment and handling. In fact several position-defining formations can be provided on the slide mount, including one at the very end of the rail so the installer or remover can easily detect when the latch is at the end of the rail. The holder can itself be of the sealed type that keeps the latch dry and the latch itself is connected via bowden cables, rod links, and if necessary electrical supply lines to the various switches and handles that control it.

BRIEF DESCRIPTION OF THE DRAWING

The above and other objects, features, and advantages will become more readily apparent from the following description, reference being made to the accompanying drawing in which:

FIG. 1A is a section taken along line IA—IA of FIG. 1;

FIG. 2 is a somewhat larger perspective view of the door according to this invention immediately before installation of its latch;

SPECIFIC DESCRIPTION

Figure 1:
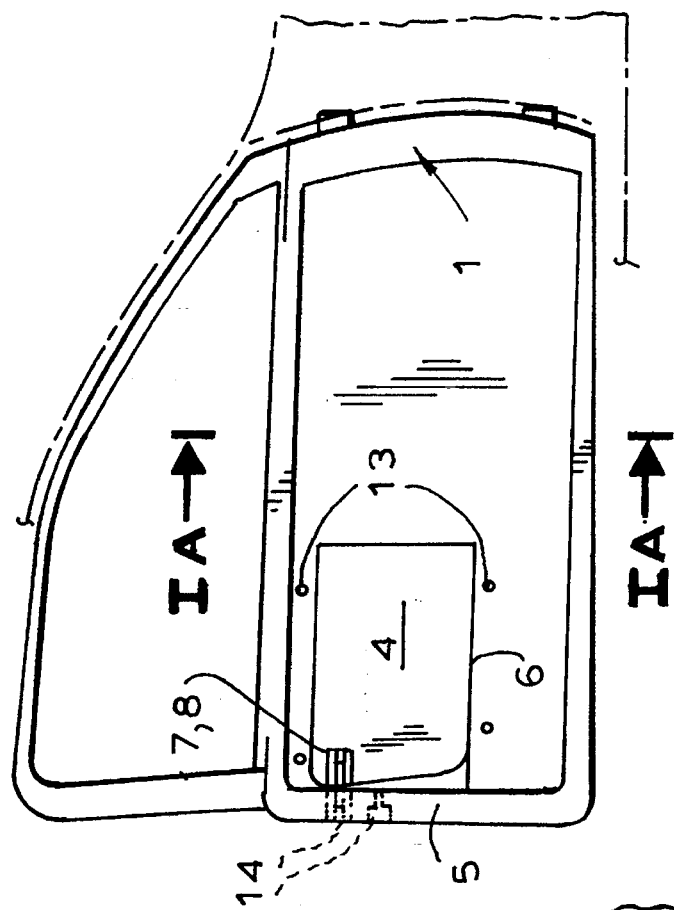
FIG. 1 is a small-scale elevational view from the inside of a car door according to the invention.
Figure 3:
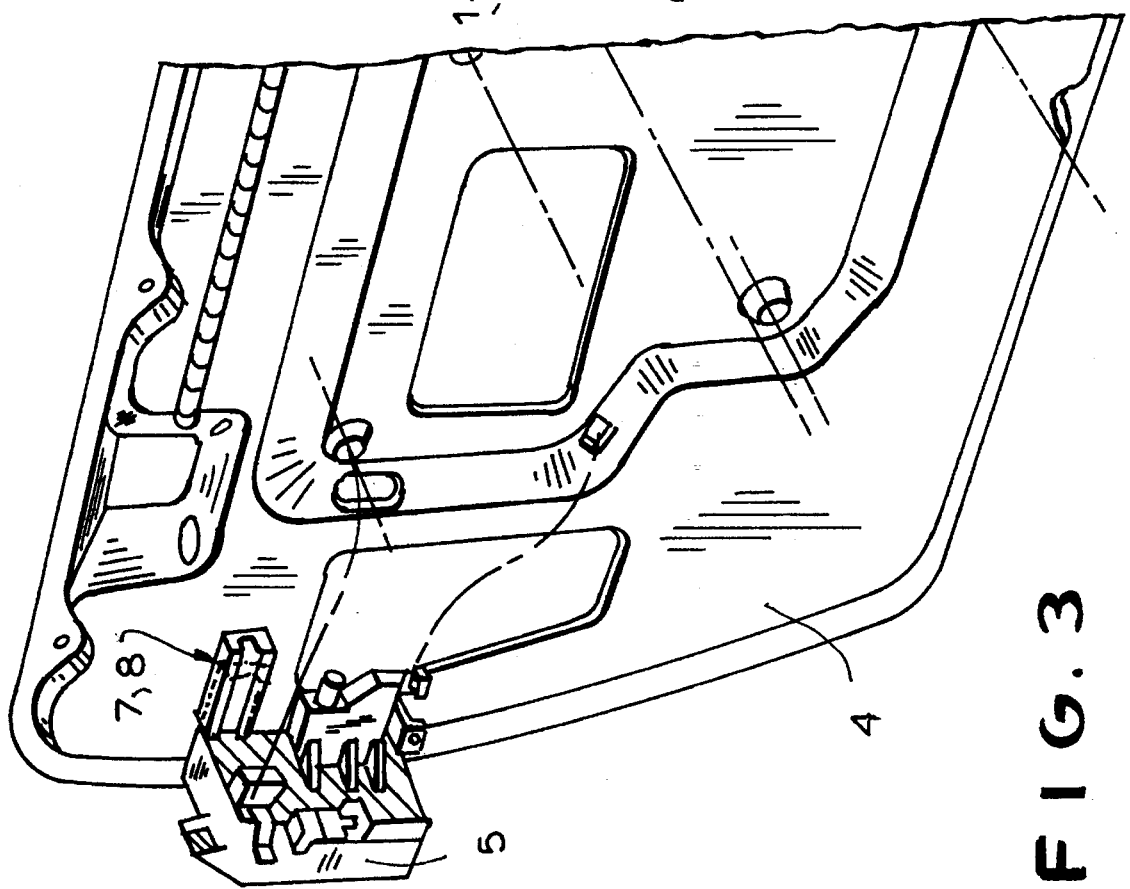
FIG. 3 is a view like FIG. 2 but with the latch installed.

As seen in FIGS. 1 and 1A a motor-vehicle door has an outside wall or skin 2 and an inside wall or skin 3, the latter formed with a hole or cutout 6 in which is fitted a holder 4 to which is secured a door latch 5. A decorative panel 16 normally covers the inside skin 3. This assembly of holder 4 and latch 5, as well as other parts such as a window guide 15 (FIG. 2) that serve for opening and closing the door's window, is installed from inside the door and is normally secured in place by screws such as shown at 13 engaged between the inside door skin 3 and the holder 4.

Figure 4:
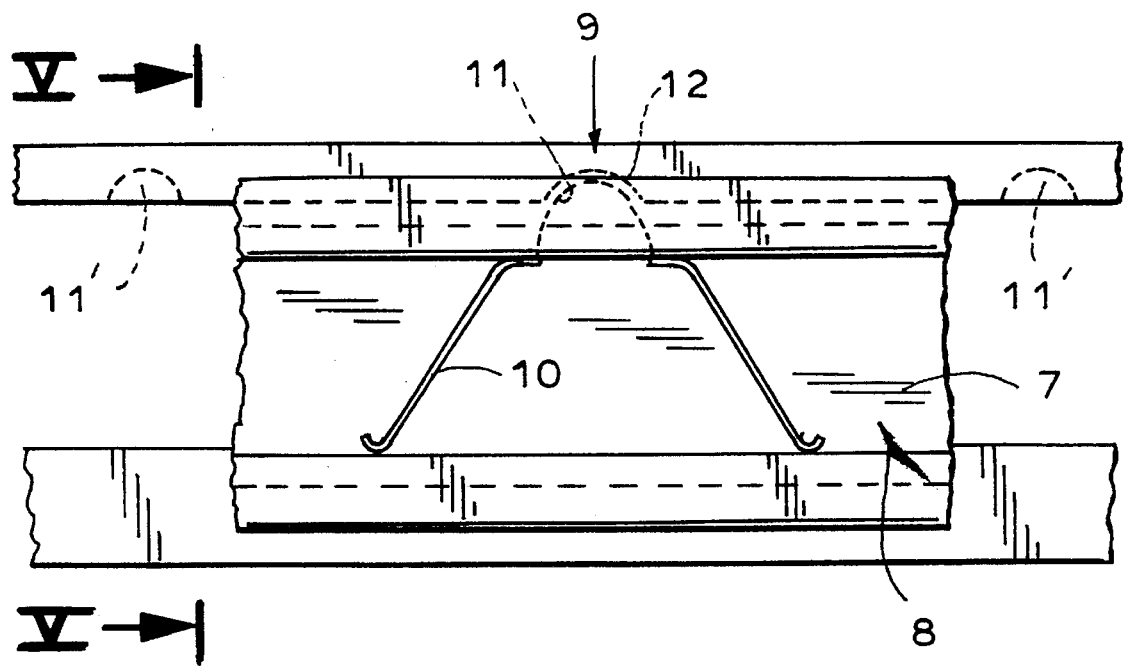
FIG. 4 is a larger-scale view showing the attachment of the latch to the door.
Figure 5:
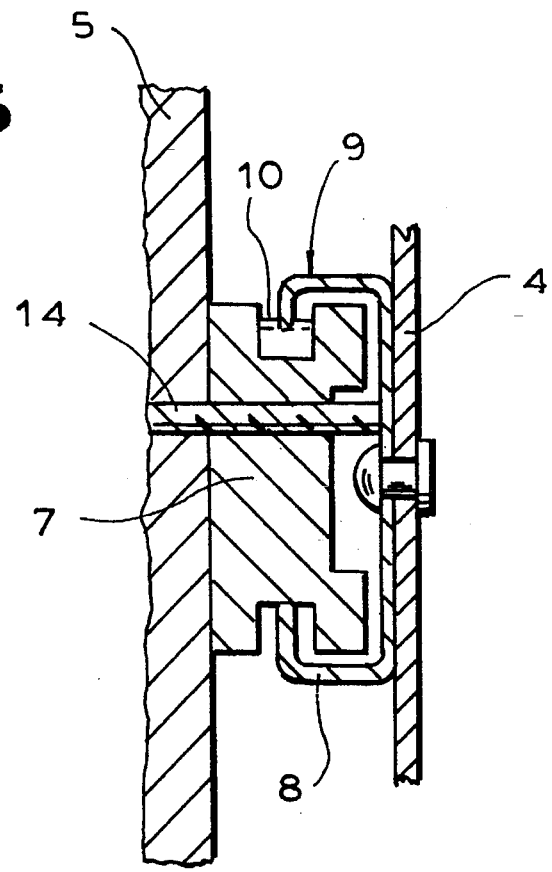
FIG. 5 is a section taken along line V—V of FIG. 4.

The latch 5 itself as shown in FIGS. 4 and 5 is provided with a longitudinally extending rail 7 formed with longitudinally extending and vertically oppositely open grooves in which engage arms of a C-section rail 8 riveted to the holder 4. Thus the latch 5 can slide horizontally parallel to the vehicle travel direction on the rail 7. Screws such as indicated at 14 can engage through the latch 5 with the rail 8 and holder 4 to arrest the latch on the holder 4 and through the door edge to secure the latch 5 in position.

A detent assembly 9 is provided to define a predetermined normal position of the latch 5 on the holder 4, allowing the assembly to be handled prior to installation without the latch 5 falling off. This assembly 9 comprises a leaf spring 10 braced on the rail 7 and having a bight 12 engaged in a notch 11 of the rail 8. In fact several such detents or notches can be provided as indicated at 11'. The main notch 11 is positioned in what is the normally desired position of the latch 5 on the holder 4; when necessary the latch 5 is shifted and clamped in a new position.

We claim:

1. A motor-vehicle door comprising:

an outer skin;

an inner skin fixed to the outer skin, forming therewith a cavity, and formed with a cutout;

a mechanism holder releasably secured in the cavity at the cutout;

a latch;

means including a horizontally effective slide mount engaged between the latch and the holder for displacement of the latch horizontally on the holder and for fixing the latch on the holder in any of a plurality of horizontally offset positions thereon; and means including a detent engaged between the slide mount and the latch for releasably securing the latch in a one of the positions.

2. The motor-vehicle door defined in claim 1 wherein the slide mount includes a pair of interfitting and horizontally extending rails respectively fixed to the holder and to the latch.

3. The motor-vehicle door defined in claim 2 wherein one of the rails engages around the other rail.

4. The motor-vehicle door defined in claim 3 wherein the other rail is fixed to the latch and the one rail to the holder.

5. The motor-vehicle door defined in claim 1 wherein the detent means includes a spring braced against one of the rails and a formation on the other rail operatively engageable with the spring.

6. The motor-vehicle door defined in claim 5 wherein the formation is a notch and the spring has a bight resiliently engageable in the notch.

* * * * *